(12) United States Patent
Roger et al.

(10) Patent No.: US 12,388,214 B2
(45) Date of Patent: Aug. 12, 2025

(54) MOISTURE-PROTECTED ELECTRICAL CONNECTION

(71) Applicant: FEW Fahrzeugelektrik Werk GmbH & Co. KG, Zwenkau (DE)

(72) Inventors: David Roger, Leipzig (DE); Benjamin Höbelt, Weißenfels (DE)

(*) Notice: Subject to any disclaimer, the term of this patent is extended or adjusted under 35 U.S.C. 154(b) by 294 days.

(21) Appl. No.: 17/970,818

(22) Filed: Oct. 21, 2022

(65) Prior Publication Data

US 2023/0155317 A1    May 18, 2023

(30) Foreign Application Priority Data

Nov. 17, 2021 (DE) .......................... 102021129991.8
Feb. 4, 2022 (DE) .......................... 102022102708.2
May 4, 2022 (DE) .......................... 102022110991.7

(51) Int. Cl.
| H01R 13/00 | (2006.01) |
| H01R 13/52 | (2006.01) |
| H01R 43/02 | (2006.01) |

(52) U.S. Cl.
CPC ............ H01R 13/52 (2013.01); H01R 43/02 (2013.01)

(58) Field of Classification Search
CPC ................................ H01R 13/52; H01R 43/02
See application file for complete search history.

(56) References Cited

U.S. PATENT DOCUMENTS 9,564,690 B2 * 2/2017 Kondo ..................... H01R 4/70

FOREIGN PATENT DOCUMENTS

| EP | 1619759 A1 | 1/2006 | ............ H01R 12/08 |
| EP | 1619759 B1 | 12/2006 | ............ H01R 12/08 |
| EP | 3382819 A1 | 10/2018 | ........... H01R 13/506 |

* cited by examiner

*Primary Examiner* — Phuong Chi Thi Nguyen
(74) *Attorney, Agent, or Firm* — Bodner & Bodner, PLLC; Christian P. Bodner; Gerald T. Bodner

(57) ABSTRACT

The invention relates to a moisture-protected electrical connection between a flat conductor and an insulated cable with a different cross-section to this and a soldering point, wherein a stripped, exposed cable end is surrounded by a solder foot or a cable end sleeve at the soldering point and is in material contact with an end of the flat conductor, and also a protective body.

6 Claims, 3 Drawing Sheets

MOISTURE-PROTECTED ELECTRICAL CONNECTION

The invention relates to a moisture-protected electrical connection between a flat conductor and an insulated cable with a different cross-section to this and a soldering point, wherein a stripped, exposed cable end is surrounded by a solder foot or a cable end sleeve at the soldering point and is in material contact with an end of the flat conductor, and also with a protective body according to the preamble of Claim 1.

A fluidically sealed housing for electrical connections is known from EP 3 382 819 A1.

It discloses a method for sealing an electrical connection, wherein the connection between an electrical connecting element and an electrical conductor arranged on a transparent disc is shown. This solution is intended to provide protection against environmental influences. The method comprises applying a mechanically protective envelope to the transparent disc to define an internal volume in between. The actual electrical connection is arranged in the internal volume and is spaced apart from the envelope.

At least one part of the internal volume is subsequently filled with a sealing material, which prevents the ingress of moisture into the internal volume and thus provides a fluidic barrier around the electrical connection.

An electrical line connection and a method for producing such a line connection is known from EP 1 619 759 B1. The focus there is on line connections that involve a transition from a ribbon conductor to a cable. One particular application relates to composite discs.

In the case of the line connection according to EP 1 619 759 B1 with a cross-sectional transition from a flat conductor comprising a carrier film and at least one conducting path to a cable, the electrical connection is established at the cross-sectional transition. This is completely covered with an adhering electrically insulating mass.

The cross-sectional transition and the electrical connection is covered by a more rigid protective body, in addition to the adhering mass.

The adhering insulating and sealing compound should be permanently elastic. The protective body is attached laterally after application of the insulating compound such that the insulating compound is enclosed completely and with common boundaries.

In one further development, the protective body has at least one recess for the visual inspection of the connection area, wherein the insulating compound is to be composed of an optically transparent plastic.

However, it has been shown that the relatively rigid material of the known protective body does not lead to adequate sealing in the region of the enclosure of the corresponding insulated cable section.

For this reason, it is necessary in accordance with EP 1 619 759 B1 to completely cover the actual connection area, i.e. in particular a soldering point, with an insulating compound in order to eliminate the ingress of moisture into this connection area. In order to be able to visually inspect the soldering point, the abovementioned window must now be formed in the protective body and the insulating compound must be transparent. However, in this regard, there is a substantially limiting condition in the selection of the material for the insulating compound with the problems of influence on the electrical properties of the soldering point precisely by the insulating compound material used which completely covers the soldering point.

From the foregoing, it is therefore the object of the invention to specify a further developed moisture-protected electrical connection between a flat conductor and an insulated cable with a different cross-section to this and with a soldering point, wherein, on the one hand, the soldering point and thus the electrical connection can be visually inspected and monitored for as long as possible in the production process and, on the other hand, it is ensured that the necessary sealing is provided in particular in the region of the insulated, usually flexible cable even under long-term conditions and with critical environmental influences.

The object of the invention is achieved by a moisture-protected electrical connection in accordance with the combination of features according to Claim 1, wherein the subclaims comprise at least expedient embodiments and further developments.

The invention accordingly relates to a moisture-protected electrical connection, which is to be made between a flat conductor and an insulated cable with a different cross-section to this and which includes a soldering point, wherein a stripped, exposed cable end is surrounded by a solder foot or a cable end sleeve at the soldering point and is in material contact with an end of the flat conductor, and there is a protective body.

According to the invention, the protective body consists of a sandwich arrangement.

First, an insulating, elastic mass of a first material is formed into what is essentially a bead. This bead surrounds the soldering point spaced over the surface without covering it.

The bead extends both to the soldering point upper side of the flat conductor and to its lower side and extends into a region in which the insulation of the cable and the flat conductor no longer touch or lie on top of one another.

The bead together with the space enclosed by it is enclosed by a second material for the sandwich formation.

The first material is designed in the operational state of the electrical connection, i.e. when it is ready for operation, such that the first material has a lower hardness than the second material.

Furthermore, the bead in the cable sheath section has a concave transition zone facing the cable surface in order to further improve the sealing.

The bead including the flat conductor or the insulating cable has a substantially circular or oval cross-sectional area.

The second material of the sandwich arrangement is in particular translucent or transparent.

Furthermore, the first material has a residual or permanent elasticity in the operational state of the connection.

Thanks to the arrangement of the bead also in the area where the flat conductor and insulation of the cable no longer touch, a sufficient tight connection is achieved. In this respect, it is not necessary for the material forming the bead to penetrate the usually existing narrow gap between the insulating envelope of the cable and the flat conductor.

The invention shall be explained in more detail below based on an exemplary embodiment using figures.

Figure 1:
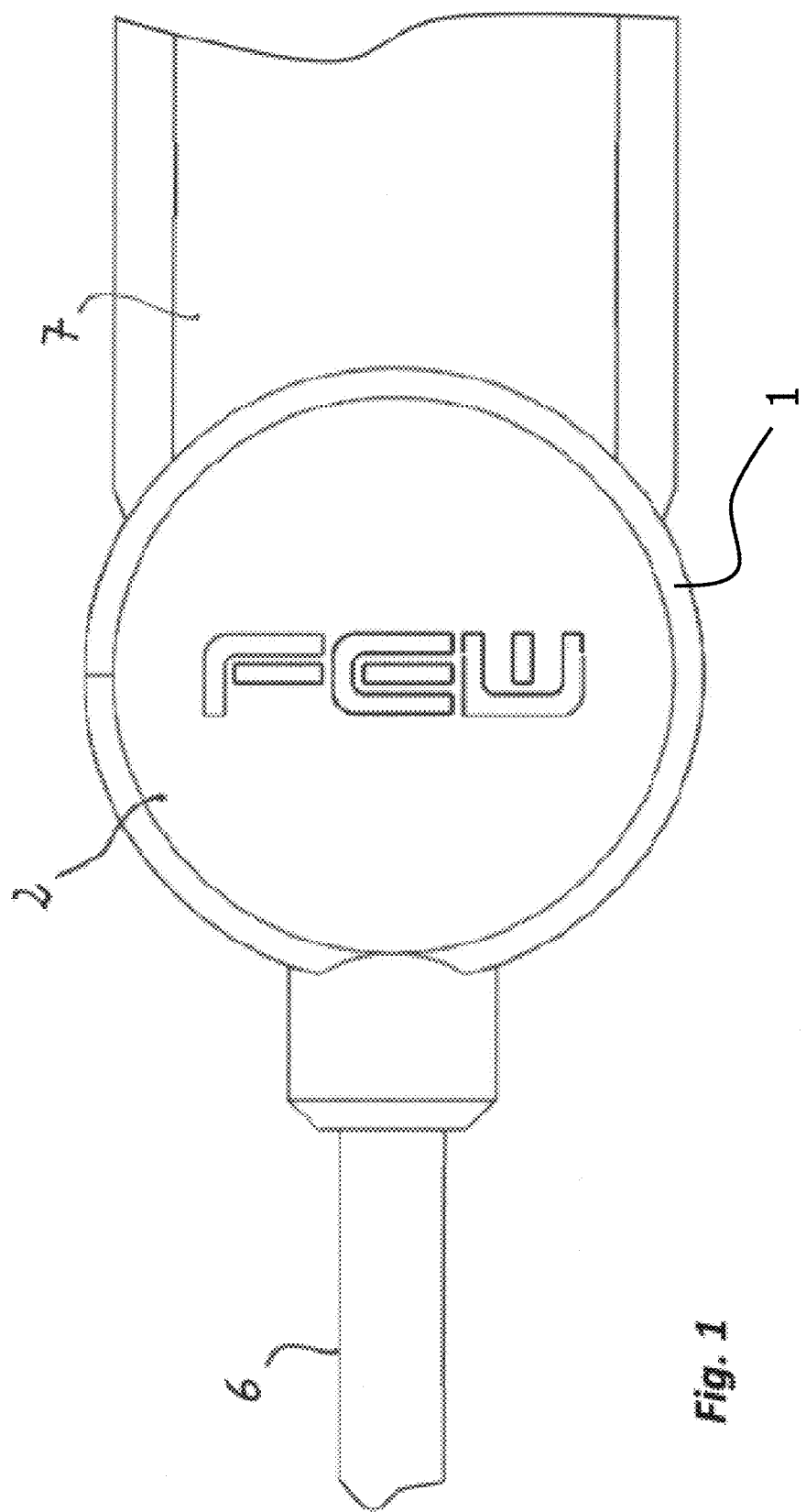
FIG. 1 is an illustration in the form of a plan view of a moisture-protected electrical connection with a flexible connection cable on the one hand and a flat conductor with a different cross-section to this with soldering point connection area.
Figure 2:
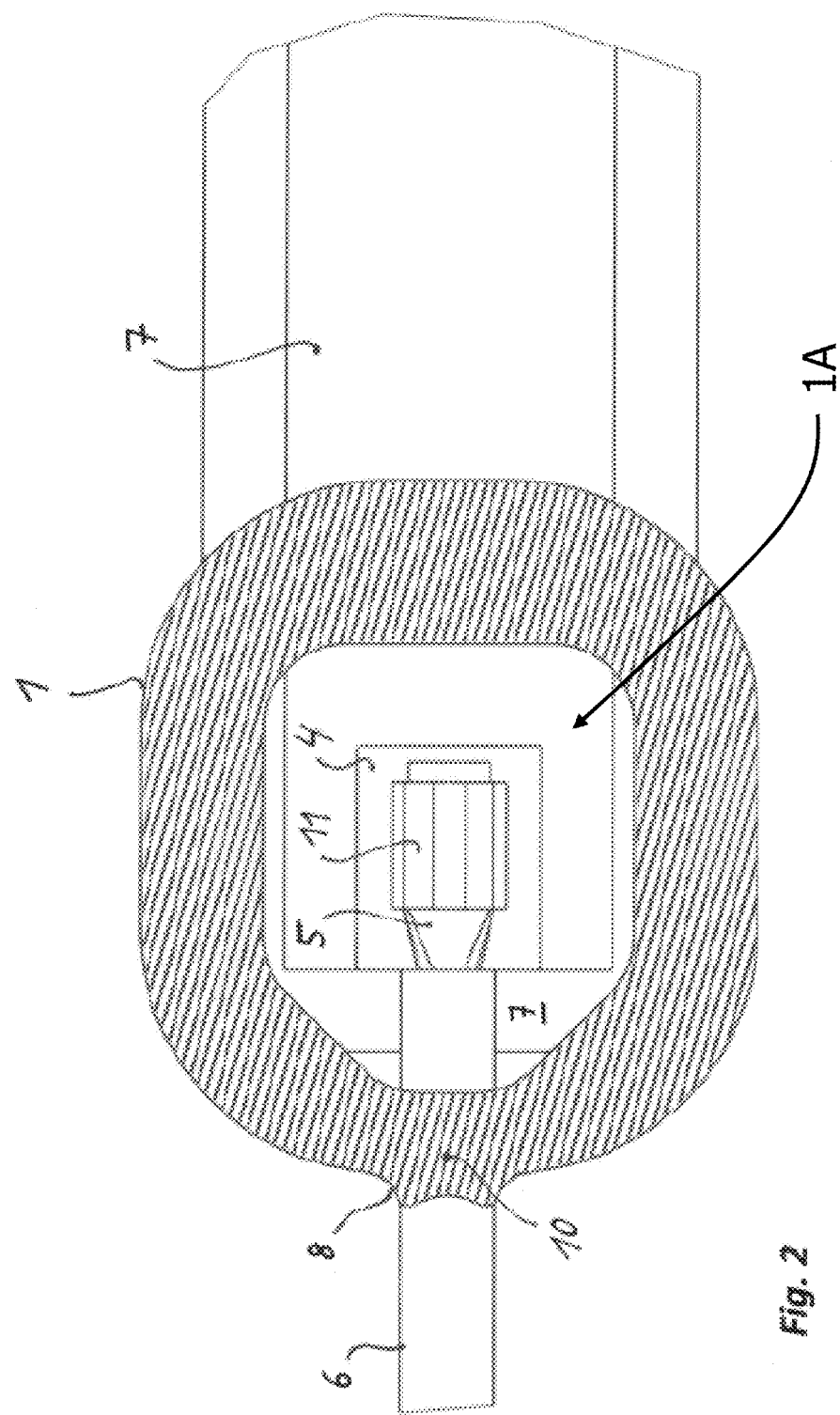
FIG. 2 is an illustration similar to FIG. 1, but without the second material enveloping the connection area with the solder joint area still completely exposed, not covered and surrounded only laterally by the bead (illustrated in section)

The moisture-protected electrical connection according to the exemplary embodiment is based on a flat conductor 7, which has a soldering section 4.

In the region of the soldering section 4, an electrical connection is established between the stripped end 5 of an otherwise insulated cable 6.

The stripped end 5 of the cable 6 is surrounded by a solder foot or a ferrule or cable end sleeve 11 and is in material electrical contact with the section 4 in the soldering process.

Figure 3:
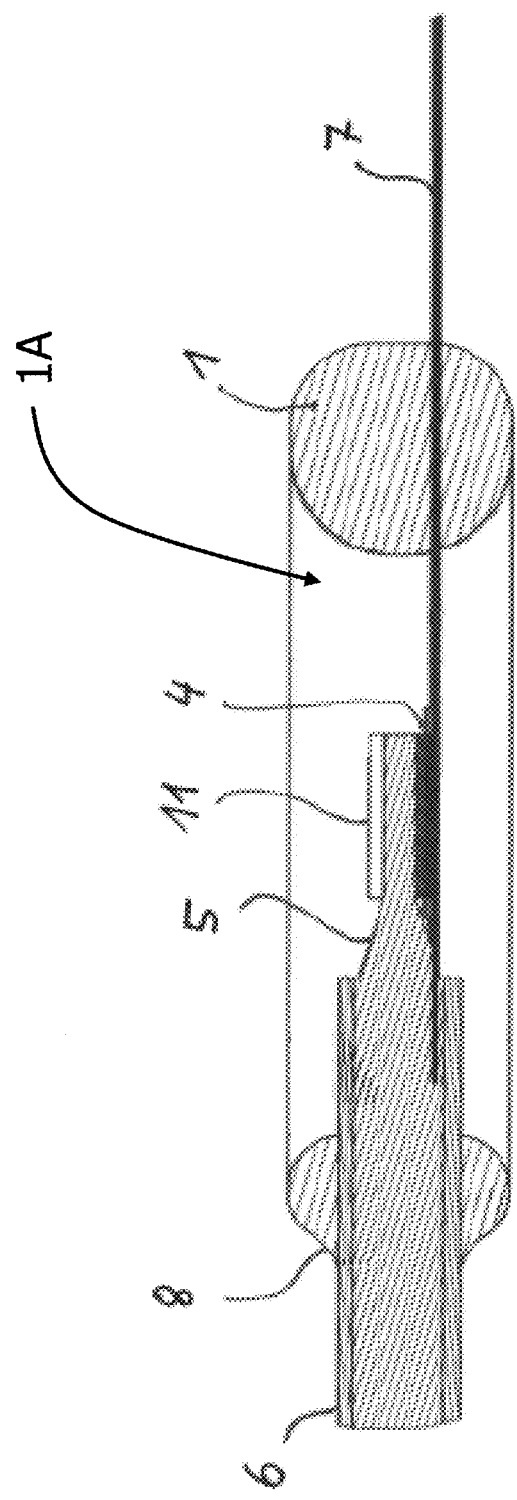
FIG. 3 is a sectional illustration of the moisture-protected connection with the recognizable cross-sectional area of the bead.

The formation of a bead 1, as shown in FIG. 3, which surrounds the upper and lower side of the flat conductor 7 in the area around the solder joint and at a distance from it, is now essential for moisture protection.

The bead 1 is extended up to a region 10 in which the insulation of the cable 6 and the flat conductor 7 no longer touch or lie on top of one another.

In this region 10, the bead 1 envelops the insulating envelope of the cable 6 completely and sufficiently, forming a concave transition zone 8.

This eliminates the ingress of moisture in the direction of the solder joint region.

After a visual and, if necessary, electrical inspection of the solder joint, the bead 1 together with the space 1A enclosed by it is enclosed by a second material for the sandwich formation, which is indicated in FIG. 1 with reference numeral 2.

This second material 2 can be translucent or transparent in order to enable a visual check of the solder joint or connection area even in the long run. A company logo, e.g. "FEW", can also be attached.

For the material of the bead 1, which is shown as a pre-sealant in the form of a ring, a material was used which has the most satisfactory adhesion properties to the corresponding materials, such as the cable insulation, the solder and the film or flat conductor 7 used. The product Technomelt PA 678 Black, also known as Macromelt OM 678 produced by the company AG & Co. KGaA is preferably used here.

This product is a hot melt polyamide, which is thermoplastic and has a temperature resistance of up to 160 degrees.

The fully enclosing protective body from a second material 2, which is applied at a later time, preferably consists of a potting material Ultramid B3K.

This material, originating from BASF AG, ensures the required mechanical properties for the finished part. The material is also advantageous in terms of its low processing temperature and its low viscosity. Higher processing temperatures as well as higher viscosity lead to greater stress on the PI film adhesive, which is bonded to the copper conductor, and ultimately also to unnecessary stress in relation to the pre-sealant.

Surprisingly, it was observed that the pre-sealant was not undermined when the Ultramid material was used.

The Ultramid is a free-flowing, stabilizing and fast processing injection-moulding material.

The invention claimed is:

1. Moisture-protected electrical connection between a flat conductor (7) and an insulated cable (6) with a different cross-section to this and a soldering point, wherein a stripped, exposed cable end (5) is surrounded by a solder foot or a cable end sleeve at the soldering point and is in material contact with the end of the flat conductor (7), and also with a protective body, characterized in that the protective body comprises an insulating, elastic mass of a first material that is formed into a bead (1) and surrounds the soldering point spaced over the surface and extends both to the soldering point upper side of the flat conductor and to its lower side and is extended up to a region (10) in which the insulation of the cable (6) and the flat conductor (7) no longer touch or lie on top of one another, wherein the bead (1) defines a space around the soldering point, wherein at least a portion of the bead (1) and the space are enclosed by a second material (2) in a sandwich arrangement.

2. Moisture-protected electrical connection according to claim 1, characterized in that the first material has a lower hardness than the second material (2) in the operational state of the connection.

3. Moisture-protected electrical connection according to claim 1, characterized in that the bead (1) has a concave transition zone (8) facing a surface of the cable in the region (10).

4. Moisture-protected electrical connection according to claim 1, characterized in that the bead (1) including the flat conductor (7) or the insulated cable (6) has a substantially circular or oval cross-sectional area.

5. Moisture-protected electrical connection according to claim 1, characterized in that the second material (2) is translucent or transparent.

6. Moisture-protected electrical connection according to claim 1, characterized in that the first material has a residual or permanent elasticity in the operational state of the connection.

\* \* \* \* \*